United States Patent [19]
Hayashi

[11] Patent Number: 5,459,744
[45] Date of Patent: Oct. 17, 1995

[54] LASER HAVING FREQUENCY CONVERSION ELEMENT

[75] Inventor: Toshimitu Hayashi, Tokyo, Japan

[73] Assignee: NEC Corporation, Tokyo, Japan

[21] Appl. No.: 340,369

[22] Filed: Nov. 14, 1994

[30] Foreign Application Priority Data

Nov. 11, 1993 [JP] Japan .................... 5-305766

[51] Int. Cl.$^6$ .................................................. H01S 3/108
[52] U.S. Cl. ................................................ 372/21; 359/326
[58] Field of Search ................................ 359/326–332; 385/122; 372/21–22

[56] References Cited

FOREIGN PATENT DOCUMENTS 3-148888 6/1991 Japan .

OTHER PUBLICATIONS

"High Efficiency Frequency Multiplication of Continuous Wave Ion–Laser", *Applied Physics*, vol. 61, No. 9, 1992, pp. 931–934.
by Chang et al., *General Physics*, Russian Academy, Moscow, CLEO '93, pp. 634–637.

*Primary Examiner*—John D. Lee
*Attorney, Agent, or Firm*—Young & Thompson

[57] ABSTRACT

In a laser having a frequency conversion element or a non-linear optical element such as a second-harmonic generation (SHG) element arranged on an optical axis of a laser light and outputting a frequency-converted laser light, laser incident and emitting faces of the SHG element have such convex form as cylindrical lenses with a common center axis of curvature thereof and orthogonal to the optical axis of the laser light. The SHG element is rotatable about the common center axis of curvature so that an optimum control of phase matching angle is possible. Since the common center axis of curvature of the laser incident and emitting faces of the SHG element is coincident with the rotational axis thereof, an optical axis of a fundamental wave of the laser light source is not deviated when the SHG element is rotated and thus reduction of fundamental wave laser output can be restricted. Further, a control mechanism for always maintaining wavelength conversion efficiency of the SHG element at maximum may be added, in which changes of a second-harmonic wave output light, caused by minute variation of rotation angle given to the SHG element, is detected to automatically control the phase matching angle.

15 Claims, 4 Drawing Sheets

LASER HAVING FREQUENCY CONVERSION ELEMENT

BACKGROUND OF THE INVENTION

The present invention relates to a laser having a frequency conversion element and, in particular, an ultraviolet laser using a non-linear optical element.

A conventional ultraviolet laser utilizes a non-linear optical element such as a second-harmonic generation (SHG) element, which in response to a visible laser light emits ultraviolet rays by wavelength conversion. An example of a conventional ultraviolet laser which uses an argon laser tube as a visible laser light source and β barium borate crystal (β-BaB$_2$O$_4$; referred to as BBO crystal, hereinafter) as an SHG element is disclosed in "High Efficiency Frequency Multiplication of Continuous Wave Ion-Laser", *Applied Physics,* Vol. 61, No. 9 (1992), pp. 931–934. In the disclosed ultraviolet laser which is shown schematically in FIG. 1, an argon laser tube 101, a condenser lens 104 and an SHG element 105 disposed between a pair of cylindrical lenses 106 are arranged in that order between a reflecting mirror 102 and an output mirror 103 to form an optical resonator. A fundamental wave having wavelength of 514 nm from the argon laser tube 101 is converted into a second-harmonic wave (wavelength of 257 nm) by passing through the SHG element 105 of the optical resonator and ultraviolet light is emitted from the output mirror 103. Since wavelength conversion efficiency of the SHG element is proportional to a square of laser field density, it is improved by condensing laser light by the condenser lens 104. In this laser, since tolerance width of angular phase matching (incident laser light deviation at which wavelength conversion efficiency becomes a half) of the BBO crystal 105 which is the SHG element in a first phase matching in which an optical axis of the BBO crystal 105 is in a horizontal direction in the drawing sheet (polarizing direction of argon laser) is larger than that in a direction perpendicular to the horizontal direction, the laser beam is enhanced by the cylindrical lenses 106 to thereby improve the conversion efficiency.

In this prior art, however, there is a tendency of the actual incident angle of the fundamental wave to deviate with respect to the phase matching angle of the SHG element due to vibration, mechanical shock and/or environmental temperature variation during its use, since the SHG element is arranged between the cylindrical lenses and such deviation is difficult to be regulated. For these reasons, the wavelength conversion efficiency thereof is degraded. Particularly, since wavelength conversion efficiency of the BBO crystal which is a typical SHG element for ultraviolet light is reduced by half upon incident angle deviation of only 0.1 degree, an oscillation of such conventional laser as shown in FIG. 1 which includes many optical parts to be optically regulated may easily go undetected.

Further, in the example shown in FIG. 1, reflection loss between the cylindrical lenses and the SHG element is large and highly efficient wavelength conversion is difficult.

SUMMARY OF THE INVENTION

An object of the present invention is to provide a laser having a non-linear optical element constructed such that reflection loss is minimized.

Another object of the present invention is to provide an ultraviolet laser which has high wavelength conversion efficiency and in which disorder of phase matching due to increase of temperature of the non-linear optical element can be easily regulated.

A further object of the present invention is to provide an ultraviolet laser capable of always maintaining high wavelength conversion efficiency by automatically detecting and easily regulating improper phase matching due to increase of temperature of the non-linear optical element.

According to the present invention, in a laser having a non-linear optical element such as the SHG element arranged on an optical axis thereof and outputting a laser light which frequency being converted, the laser light ,emitting surfaces of the non-linear optical element are formed as convex surfaces of a cylindrical lens with center axes of curvatures thereof being coincident with each other and being orthogonal to the optical axis of the laser.

Further, according to the present invention, an optimum control of phase matching angle, becomes possible by making the non-linear optical element rotatable about the center axis of the curvature. Since the center axis of the curvature of the laser light emitting surface of the non-linear optical element is coincident with the rotation center thereof and therefore there is no deviation of optical axis of a fundamental wave of a laser light source even if the non-linear optical element is rotated, reduction of output of fundamental laser wave can be restricted.

According to the present invention, it is further possible to add a mechanism with which wavelength conversion efficiency of a non-linear optical element can be always maintained at its maximum, by detecting a variation of the output laser light such as the secondary harmonic output light while varying the rotation angle of the non-linear optical element slightly and automatically controlling the phase matching angle on the basis of the detected laser light variation.

DESCRIPTION OF THE PREFERRED EMBODIMENTS

Figure 1:
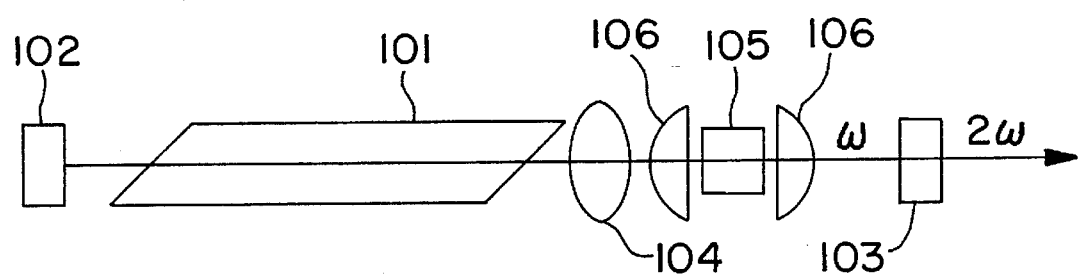
FIG. 1 shows schematically a construction of a conventional ultraviolet laser.
Figure 2A:
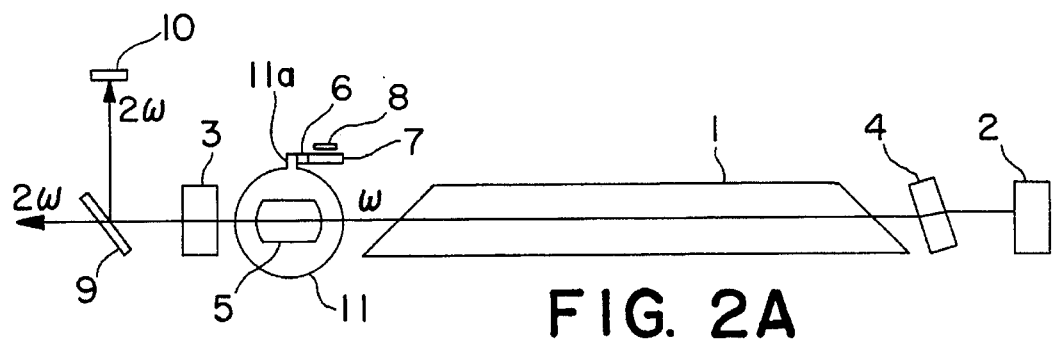
FIG. 2A shows schematically a construction of an ultraviolet laser according to a first embodiment of the present invention.

Referring to FIG. 2A, a fundamental wave oscillator portion is constituted of an argon laser tube 1, and an optical resonator composed of a reflection mirror 2, an output mirror 3 and an etalon 4. A wave length converter portion is composed of an SHG element 5 having an incident surface and an emitting surface which are convex. An output stabilizer portion is constituted of a turntable 11 supporting the SHG element 5, a drive portion for rotationally vibrating the turntable 11 slightly and an output light monitor portion. The drive portion is constituted of an electrostrictive element 6, a metal rod 7 and a Peltier effect element 8 for heating or cooling the metal rod 7. The monitor portion is constituted of a beam splitter 9 for splitting a monitor light and a light detecting element 10 for monitoring an output light.

In the fundamental wave oscillator portion, a gain is provided by the argon laser tube 1 and a laser oscillation at wavelength of 514 nm is obtained by reflecting an output laser light of the argon laser tube 1 between the reflecting mirror 2 and the output mirror 3. The etalon 4 is arranged on an axis of the laser light to realize a single longitudinal mode.

Figure 2B:
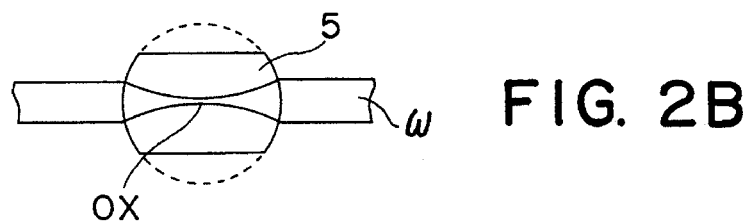
FIG. 2B is an enlarged plan view of the ultraviolet laser shown in FIG. 2A, showing a relationship between an SHG element and a laser light.
Figure 2C:
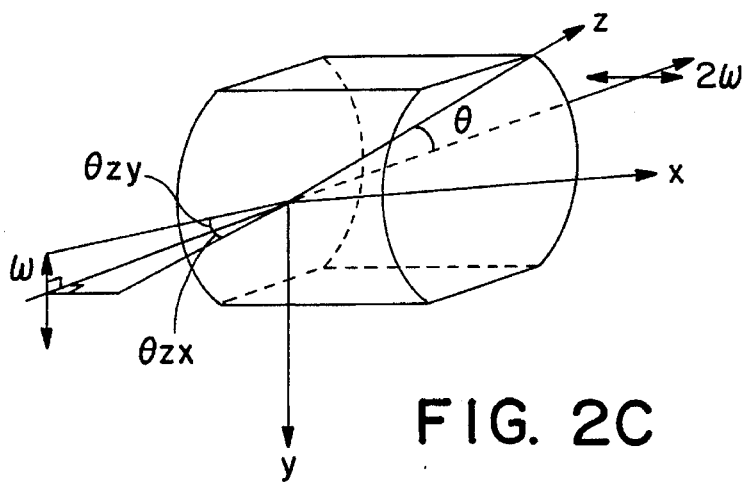
FIG. 2C is a perspective view of the SHG element shown in FIG. 2A.
Figure 2D:
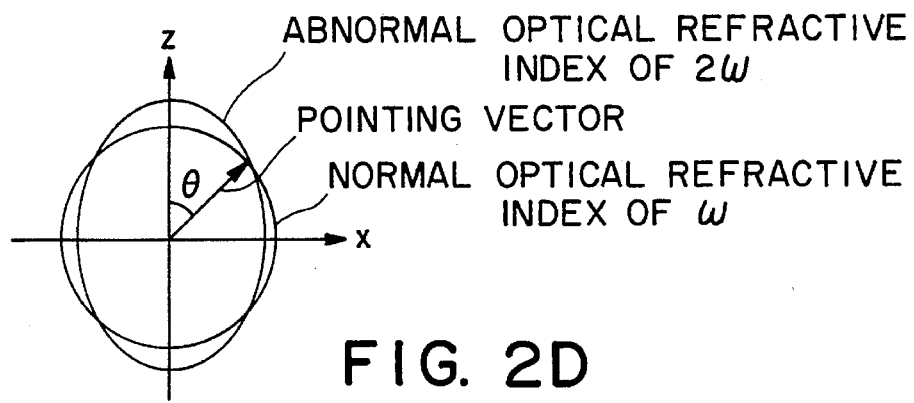
FIG. 2D is a diagram for explaining the phase matching angle of the SHG element shown in FIG. 2A.

The SHG element 5 which constitutes the wavelength converter portion is arranged within the optical resonator of the fundamental wave oscillator portion and converts the fundamental wave having wavelength of 514 nm into a second-harmonic wave having wavelength of 257 nm. As shown in FIGS. 2B and 2C, the SHG element 5 is formed from a cylindrical BBO crystal having opposing side faces (x-z plane) cut parallel to a center line of the cylinder. Therefore, an incident face and an emitting face of the SHG element 5 for laser light form cylindrical lenses having centers of curvature which are coincident. An optical axis of the SHG element 5 is regulated such that the fundamental wave ω passes through the centers of curvature as shown in FIG. 2B. In this case, the optical axis of laser light is always maintained constant even when the SHG element 5 is rotated about the center axis OX in order to match phase of the SHG element 5. Therefore, the output of the fundamental wave ω which is influenced by change of optical axis is not reduced. The phase matching is performed at an angle θ at which the normal light refractive index of the fundamental wave ω coincides with abnormal light refractive index of the second-harmonic wave 2ω, as shown in FIG. 2D. For BBO crystal, this angle is 46 degrees. The angle regulation must be done in two directions, $θ_{zx}$ direction and $θ_{zy}$ direction shown in FIG. 2C. However, since, when the BBO crystal having the above-mentioned configuration is used, light in $θ_{zx}$ direction is not reduced in cross section and an alignment of its construction is hardly changed due to the fact that the optical system is constructed with a single part, it is possible to remove the necessity of optical axis regulation in practical use, provided that it is regulated at an initial setting time. On the other hand, for optical axis regulation in the $θ_{zy}$ direction, since light in that direction is reduced in cross section and thus it falls at an angle, tolerance of angle change is small although its tolerance is generally large when the cross section is not reduced. Therefore, it is preferable in view of stability of laser output to continuously regulate the angle in that direction based on deviations of the optical axis of laser light due to change of ambient temperature.

Figure 3A:
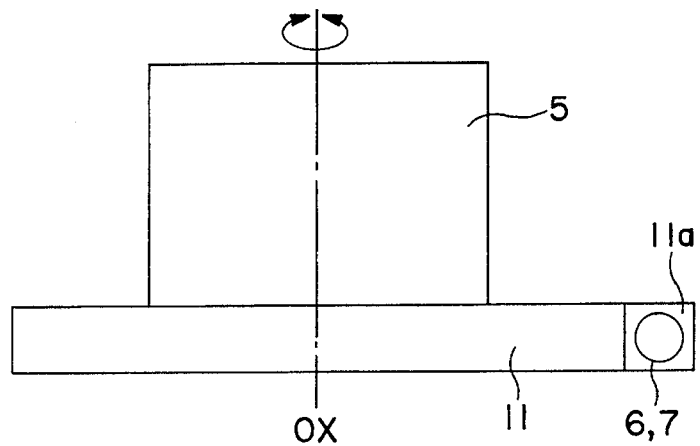
FIG. 3A is a diagram schematically showing a construction of an output stabilizer portion shown in FIG. 2A.
Figure 3B:
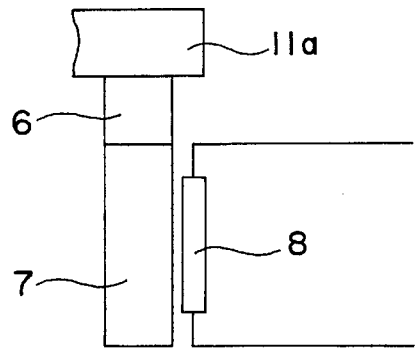
FIG. 3B shows a portion of the output stabilizer portion shown in FIG. 2A on an enlarged scale.

Stabilization of the second-harmonic wave output will be described with reference to FIGS. 3A–3C. The turntable 11 is provided with a protrusion 11a which is coupled with the electrostrictive element 6 and the metal rod 7 of stainless steel by means of adhesive, as shown in FIG. 3B. Basically, the rotation angle of the turntable 11 is changed by expansion/contraction of the electrostrictive element 6 and the metal rod 7 determines an initial value of rotation angle. Therefore, the protrusion 11a is moved vertically in FIG. 3B correspondingly to expansion/contraction of these members and the turntable 11 is rotated by a very small angle. In this case, when the rotational axis of the turntable 11 is made coincident with the center OX of the cylindrical SHG element 5, it becomes possible to regulate angle of the SHG element 5 and to match phase of the SHG element 5 by monitoring the second-harmonic wave output by means of the light receiving element and feedback-controlling the drive portion on the basis of the monitored value of the output. The metal rod 7 is preferably made of such material having a large thermal expansion coefficient.

Figure 3C:
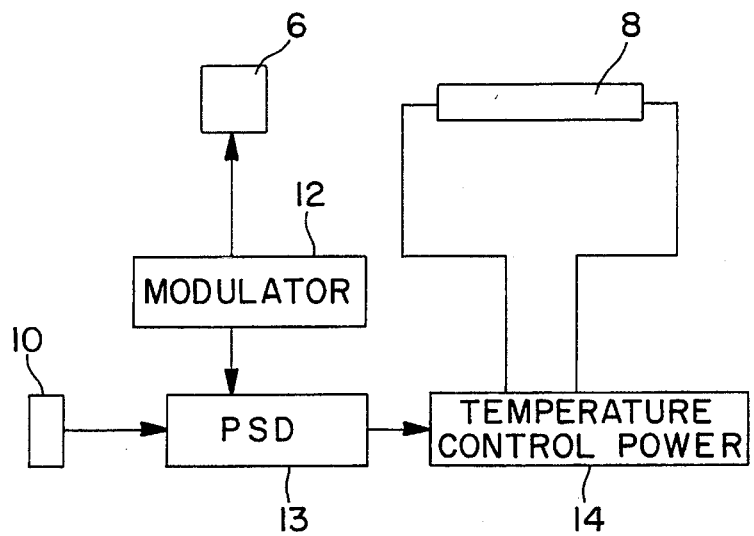
FIG. 3C is a block diagram of a control circuit for the output stabilizer portion shown in FIG. 2A.

In a block diagram of a driving system electric circuit shown in FIG. 3C, the electrostrictive element 6 is expanded/contracted by a drive pulse signal from a modulator 12. Therefore, the second-harmonic wave output from the SHG element 5 is changed and the change is detected by the light-receiving element 10. An output signal of the light-receiving element 10 is supplied to a phase sensitive detector (referred to as PSD, hereinafter) 13. The PSD 13 is further supplied with the pulse signal from the modulator 12. The PSD 13 calculates a differential output of the second-harmonic wave 2ω from the output signals of the light-receiving element 10 and the modulator 12 and controls a temperature control power source 14 to cause the Peltier effect element 8 to generate or absorb heat.

The operation of this circuit is performed qualitatively as follows: in a case where, when the electrostrictive element 6 slightly increases the incident angle of the fundamental wave ω to the SHG element 5 by a small value (on the order of 0.001 degree) from the initial value thereof, an increase of the output of the second-harmonic wave 2ω is detected, the metal rod 7 is heated by the Peltier effect element 8 and expanded. Thus, by repeating this operation by which the reference position of rotation of the SHG element 5 is increased and the incident angle of the fundamental wave ω is increased, the output of the second-harmonic wave 2ω is made closer to the maximum value. When the output exceeds the maximum value, the differential signal from the PSD 13 is inverted, so that the laser is controlled in a direction in which the output of the second-harmonic wave 2ω is increased again by cooling the Peltier effect element 8 to thereby contract the metal rod 7 and reduce the incident angle of the fundamental wave ω of the SHG element 5. By repeating this operation successively at a period on the order of 500 Hz, the output of the second-harmonic wave 2ω is continuously kept at the maximum value regardless of ambient temperature variation and thus the condition of phase matching is satisfied. Since the basic control circuit for stabilizing a laser output using the PSD 13 is well known, as disclosed for example in U.S. Pat. No. 3,555,453, details thereof are omitted in this description.

In the ultraviolet laser constructed as mentioned above, the number of parts is reduced due to the fact that the SHG element 5 itself has the role of both cylindrical lenses and optical loss between optical parts is reduced. Furthermore, since the fundamental wave passes through the center of the SHG element, the fundamental wave passes through the SHG element without refraction and the optical axis is not changed even if the SHG element 5 is rotated about its center axis. Therefore, a stable operation becomes possible and the phase matching condition can be easily satisfied. On the other hand, for regulation in $θ_{zx}$ direction, it is possible to obtain an ultraviolet laser having stabilized output without regulating the angle in this direction since the wavelength conversion is performed by the single optical part and the incident light is conducted without reducing the cross sectional area thereof.

Figure 4:
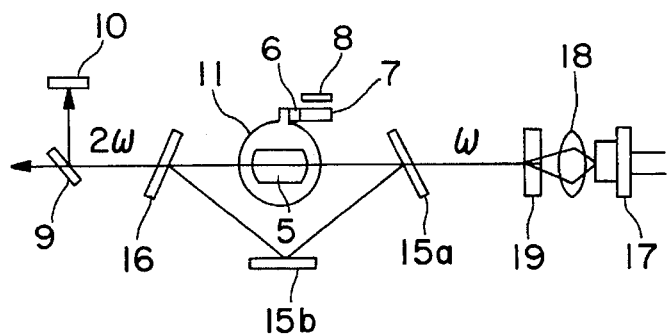
FIG. 4 is a schematic construction of a laser according to a second embodiment of the present invention.

FIG. 4 schematically shows a construction of the second embodiment of the present invention. In the second embodiment, the fundamental wave ω is generated by an optical resonator composed of a reflection mirror 2, an output mirror 3 and an argon laser tube 1, and the fundamental wave ω having wavelength of 514 nm is emitted from the output mirror 3. The emitted fundamental wave ω is directed to a reflection mirror 15a provided externally of the optical resonator. The fundamental wave ω incident on the external reflection mirror 15a passes along a triangular path defined by the reflection mirror 15a, an output mirror 16 and another reflection mirror 15b. An SHG element 5 is disposed on an optical axis of the triangle path and converts the fundamental wave ω into a second-harmonic wave 2 having wavelength of 257 nm. The second-harmonic wave ω is divided by a beam splitter 9 and a portion of the second-harmonic wave is detected by a light-receiving element 10. The SHG element 5 is disposed on a turntable 11 with which the angle regulation and phase matching are performed as in the first embodiment.

According to the second embodiment, it is possible to obtain an ultraviolet laser whose noise is smaller than in the first embodiment since the fundamental wave oscillator portion is provided separately from the wavelength converter portion and the propagating direction of light in the wavelength converter portion is limited to one direction.

Figure 5:
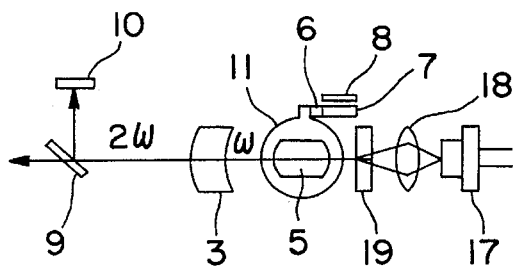
FIG. 5 is a schematic construction of a laser according to a third embodiment of the present invention.

FIG. 5 shows the third embodiment of the present invention. The third embodiment differs from the second embodiment in that the fundamental wave ω is generated by a solid state laser excited by a laser diode. That is, an exciting light having wavelength of 1064 nm from a laser diode 17 is condensed by a condenser lens 18 to excite a solid state laser medium 19 (for example, Er:YVO₄) to thereby generate visible light using multi-layered films formed on both surfaces of the solid state laser medium 19 as an optical resonator. The visible light is used as the fundamental wave ω and wavelength conversion is performed in a similar manner to that used in the second embodiment.

Figure 6:
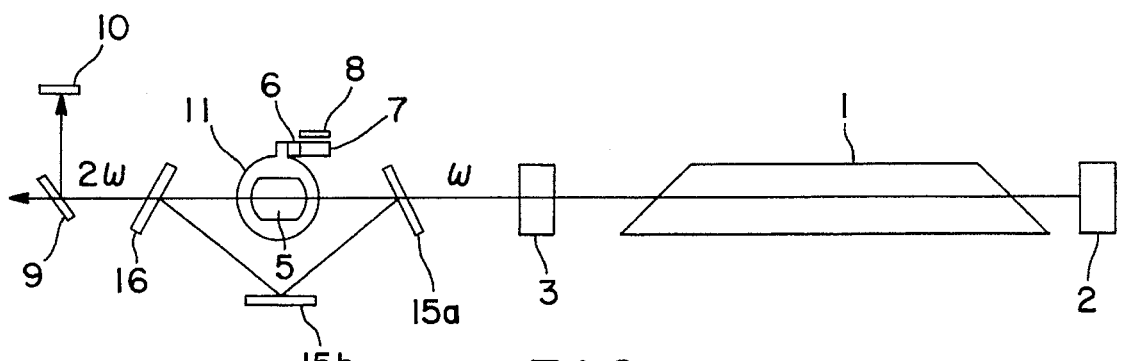
FIG. 6 is a schematic construction of a laser according to a fourth embodiment of the present invention.

FIG. 6 shows the fourth embodiment of the present invention. The fourth embodiment differs from the third embodiment in that an SHG element 5 is arranged in an optical resonator.

Exciting light emitted from a laser diode 17 is condensed by a condenser lens 18 to a solid state laser medium 19 (for example, Er:YVO₄) to optically excite the latter. An optical resonator for the fundamental wave ω is constructed with an exciting light incident side face of the solid state laser medium 19 and an output mirror 3. The SHG element 5 is arranged in the optical resonator as in the first embodiment and the angle regulation is performed in the same manner as in the first embodiment.

Although the present invention has been described with reference to the preferred embodiments, the present invention is not limited thereto and various modifications of them are possible within the scope of the present invention which is defined by the appended claims. For example, the solid state laser media such as Nd:YAG and Nd:YLF can be used. Further, instead of the electrostrictive element, a magnetostrictive element or a displacement regulator having a step motor, known by the name "motor-micro", may be used as means for giving a small rotation or pivotal movement to the turntable on which the SHG element is mounted.

As described hereinbefore, according to the present invention in which a visible light is wavelength-converted by the cylindrical SHG element, it is possible to reduce the number of parts of the wavelength converter portion and to reduce optical loss occurring between optical parts. Furthermore, according to the present invention, the incident angle of the fundamental wave ω with respect to the SHG element is always maintained perpendicular thereto even when the SHG element is rotated about the center axis thereof and therefore there is no misalignment due to refraction of the fundamental wave ω. Consequently, the angle regulation in rotational direction about the center axis of the cylindrical SHG element is facilitated.

I claim:

1. A laser comprising:

a laser light source; and a non-linear optical element disposed on an optical axis of said laser light source, said non-linear optical element having input and output cylindrical surfaces extending in a direction perpendicular to said optical axis, said cylindrical surfaces having a common center axis of curvature orthogonal to said optical axis.

2. A laser as set forth in claim 1, further comprising rotation angle control means for making a phase matching angle of said non-linear optical element coincident with said optical axis by pivoting said non-linear optical element about said common center axis.

3. A laser as set forth in claim 2, wherein said rotation angle control means comprises:

a turntable supporting said non-linear optical element and having a rotation axis coincident with said common center axis;

a table rotating means responsive to a variation signal for continually pivoting said table in either direction by a very small angle;

a light detecting element for detecting change of the output light intensity of said non-linear optical element caused by rotation of said table by said small angle;

a deviation detecting means responsive to change of an output signal of said light detecting element and said variation signal for detecting a deviation between a phase matching angle of said non-linear optical element and said optical axis; and a moving mechanism for moving a rotation angle reference of said table in such direction that an output light intensity of said non-linear optical element becomes maximum.

4. A laser as set forth in claim 3, wherein said table rotating means comprises a piezo-electric element coupled to said table.

5. A laser as set forth in claim 4, wherein said table rotating means further comprises a metal rod coupled to said piezoelectric element and means for controlling temperature of said metal rod having large thermal expansion coefficient.

6. A laser as set forth in claim 5, wherein said deviation detecting means comprises a phase sensitive detector for detecting phases of said output signal and said variation signal and outputting a differential signal.

7. A laser as set forth in claim 1, wherein said laser light source comprises an argon laser and said non-linear optical element is of β barium boride crystal.

8. A laser as set forth in claim 7, further comprising an etalon provided in a laser resonator of said argon laser.

9. A laser as set forth in claim 1, wherein said laser light source comprises a solid state laser excited by a semiconductor laser.

10. A laser as set :forth in claim 1, wherein an output laser light of said laser light :source is input to a set of mirrors arranged to form a ring-shaped optical axis and said non-linear optical element is arranged on said ring-shaped optical axis.

11. A laser comprising:

a laser light source; and a single non-linear optical element having a cylindrical configuration comprising opposed cylindrical surfaces having a common axis of curvature and being arranged on an optical axis of said laser light source such that said optical axis passes through said opposed cylindrical surfaces, said common axis of curvature being orthogonal to said optical axis.

12. A laser as set forth in claim 11, further comprising rotation angle control means for making a phase matching angle of said non-linear optical element coincident with said optical axis by slightly rotating said non-linear optical element about said common axis of curvature.

13. A laser as set forth in claim 11, wherein said laser light source comprises an argon laser and said non-linear optical element is a second-harmonic wave generating element of β barium boride crystal.

14. A laser comprising:

a laser light source;

a rotary table having a rotation axis orthogonal to an optical axis of said laser light source;

a table rotating means for rotating said table by a minute angle; and a cylindrical non-linear optical element having cylindrical faces and mounted on said table, said cylindrical faces forming a laser light incident face and a laser light emitting face, respectively, and being in parallel to said rotation axis of said table, said laser light incident face having a center axis of curvature coincident with a center axis of curvature of said laser light-emitting face, such that an optical axis of a fundamental wave of said laser light source is not deviated when said non-linear optical element is rotated.

15. A laser as claimed in claim 14, further comprising control means for controlling a rotation angle of said table by detecting a difference between a phase matching angle of said nonlinear optical element and said optical axis.

* * * * *